United States Patent
Joshi et al.

(10) Patent No.: US 9,706,200 B2
(45) Date of Patent: Jul. 11, 2017

(54) UNIFICATION OF SIGNALING LOSSLESS CODING MODE AND PULSE CODE MODULATION (PCM) MODE IN VIDEO CODING

(71) Applicant: QUALCOMM Incorporated, San Diego, CA (US)

(72) Inventors: Rajan Laxman Joshi, San Diego, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 13/919,936

(22) Filed: Jun. 17, 2013

(65) Prior Publication Data

US 2013/0336395 A1 Dec. 19, 2013

Related U.S. Application Data

(60) Provisional application No. 61/661,242, filed on Jun. 18, 2012, provisional application No. 61/666,632, filed on Jun. 29, 2012.

(51) Int. Cl.
*H04N 7/12* (2006.01)
*H04N 19/85* (2014.01)
(Continued)

(52) U.S. Cl.
CPC ..... *H04N 19/00903* (2013.01); *H04N 19/127* (2014.11); *H04N 19/162* (2014.11);
(Continued)

(58) Field of Classification Search
CPC ........... H04N 19/00903; H04N 19/127; H04N 19/162; H04N 19/176; H04N 19/70; H04N 19/82
(Continued)

(56) References Cited

U.S. PATENT DOCUMENTS 7,236,836 B1  6/2007  Tanaka et al.
2012/0224640 A1  9/2012  Sole Rojals et al.
(Continued)

FOREIGN PATENT DOCUMENTS

GB  2503658 A  * 1/2014

OTHER PUBLICATIONS

Chono Ket Al: "BoG report on I_PCM I lossless loop filtering unification", 100. MPEG Meeting; Apr. 30, 2012-May 4, 2012; Geneva; (Motion Picture Expert Group or ISO/IEC JTC1/SC29/WG11), No. 10586-r3, May 4, 2012, pp. 1-3, XP030053573.*
(Continued)

*Primary Examiner* — Nhon Diep
(74) *Attorney, Agent, or Firm* — Shumaker & Sieffert, P.A.

(57) ABSTRACT

Techniques described herein are related to harmonizing the signaling of coding modes and filtering in video coding. In one example, a method of decoding video data is provided that includes decoding a first syntax element to determine whether PCM coding mode is used for one or more video blocks, wherein the PCM coding mode refers to a mode that codes pixel values as PCM samples. The method further includes decoding a second syntax element to determine whether in-loop filtering is applied to the one or more video blocks. Responsive to the first syntax element indicating that the PCM coding mode is used, the method further includes applying in-loop filtering to the one or more video blocks based at least in part on the second syntax element and decoding the one or more video blocks based at least in part on the first and second syntax elements.

49 Claims, 6 Drawing Sheets

(51) Int. Cl.
    *H04N 19/176*    (2014.01)
    *H04N 19/70*     (2014.01)
    *H04N 19/127*    (2014.01)
    *H04N 19/162*    (2014.01)
    *H04N 19/82*     (2014.01)

(52) U.S. Cl.
    CPC ........... *H04N 19/176* (2014.11); *H04N 19/70* (2014.11); *H04N 19/82* (2014.11)

(58) Field of Classification Search
    USPC ...................................................... 375/240
    See application file for complete search history.

(56) References Cited

U.S. PATENT DOCUMENTS

| | | |
|---|---|---|
| 2013/0010864 A1 | 1/2013 | Teng |
| 2013/0077696 A1 | 3/2013 | Zhou |
| 2013/0101025 A1 | 4/2013 | Van Der Auwera et al. |
| 2014/0036998 A1* | 2/2014 | Narroschke et al. .... 375/240.03 |

OTHER PUBLICATIONS

Chana, K.: "BoG report on I_PCM I lossless loop filtering unification, Powerpoint slides to JCTVC-I0586-r3", 100. MPEG Meeting; Apr. 30, 2012-May 4, 2012; Geneva; (Motion Picture Expert Group or ISO/IEC JTC1/SC29/WG11) JCTVC-I0586-r3, Apr. 27-May 7, 2012, 3 pp.*

Benjamin Bross: "Suggested bug-fixes for Hevc text specification draft 6" ISO/IEC JTC1/SC29/WG11 9th Meeting: Geneva, CH, Apr. 27-May 7, 2012.*

International Preliminary Report on Patentability—PCT/US2013/046289, The International Bureau of WIPO—Munich, Germany, Dec. 30, 2014, 14 pp.

International Search Report and Written Opinion—PCT/US2013/046289—ISA/EPO—Oct. 15, 2014, 20 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

Van Der Auwera et al., "AHG6: Deblocking of IPCM Blocks Containing Reconstructed Samples," JCT-VC Meeting—MPEG Meeting; San Jose, CA; (Joint Collaborative Team on Video Coding of ITU-T SG16 WP3 and ISO/IEC JTC1/SC29/WG11), No. JCTVC-H0448, Feb. 1-10, 2012, 6 pp.

Bross et al., "High Efficiency Video Coding (HEVC) text specification draft 6, pp. 46-49," MPEG Meeting; Jun. 2, 2012-Oct. 2, 2012; San Jose CA; (Motion Picture Expert Group or ISO/IEC JTC1/SC29/WG11), No. JCTVC-H1003, Apr. 2, 2012, XP002726787, pp. 46-49.

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Chono et al., "JCTVC-I0586 Supplemental Slides," MPEG Meeting; Geneva, CH; (Motion Picture Expert Group or ISO/IEC JTC1/SC29/WG11), XP002726734, retrieved from http://phenix.it-sudparis.eu/jct/doc_end_user/documents/9_Geneva/wg11/JCTVC-I0586-v5.zip on Jul. 7, 2014, 6 pp.

Chono et al., "BoG report on I_PCM/lossless loop filtering unification," MPEG Meeting; Geneva, CH; (Motion Picture Expert Group or ISO/IEC JTC1/SC29/WG11), JCTVC-I0586-r3, Apr. 27-May 7, 2012, 3 pp.

Chono et al., "Proposal of enhanced PCM coding in HEVC," MPEG Meeting; Geneva, CH; (Motion Picture Expert Group or ISO/IEC JTC1/SC29/WG11)WG11 No. m19710, Document No. JCTVC-E192-r2, Mar. 16-23, 2011, 20 pp.

Clare et al., "AHG 13: Proposed bugfix for tickets 410 and 470 related to lossless coding," JCT-VC Meeting; MPEG Meeting; Geneva, CH; (Joint Collaborative Team on Video Coding of ISO/IEC JTC1/SC29/WG11 and ITU-T SG.16); Document No. JCTVC-I0529r1, Apr. 27-May 7, 2012, 15 pp.

ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.

Partial International Search Report—PCT/US2013/046289—ISA/EPO—Jul. 21, 2014, 9 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding," JCTVC-C403, 3rd Meeting: Guangzhou, CN, Oct. 7-15, 2010, 137 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Bross et al., "High efficiency video coding (HEVC) text specification draft 7," 9th Meeting: Geneva, CH, Apr. 27-May 7, 2012, JCTVC-I1003_d0, 268 pp.

Bross et al., "High efficiency video coding (HEVC) text specification draft 7," 9th Meeting: Geneva, CH, Apr. 27-May 7, 2012, JCTVC-I1003_d4, 297 pp.

Bross et al., "High efficiency video coding (HEVC) text specification draft 7," 9th Meeting: Geneva, CH, Apr. 27-May 7, 2012, JCTVC-I1003_d5, 294 pp.

Joshi et al., "Interaction between pcm_flag and cu_transquant_bypass_flag," Joint Collaborative Team on Video coding (JCT-VC) of ITU-T SG16 WP3 and ISO/IEC JTC1/SC29/WG11, JCTVC-J0277, Jul. 11-20, 2012, 10th Meeting: Stockholm, SE, May 25, 2016, 2 pp.

Chono et al., "AHG11: Study report of JCTVC-J0169 on loop filtering control for I_PCM and TransQuantBypass modes," Jul. 11-20, 2012; Joint Collaborative Team on Video Coding (JCT-VC) of ITU-T SG 16 WP 3 and ISO/IEC JTC 1/SC 29/WG 11, Document: JCTVC-J0436, 10th Meeting: Stockholm, SE, Jul. 7, 2012, 2 pp.

Clare et al., "Crosscheck of Burst IPCM Coding Signalling (JCTVC-J0153)," Jul. 11-20, 2012, Joint Collaborative Team on Video Coding (JCT-VC) of ITU-T SG 16 WP 3 and ISO/IEC JTC 1/SC 29/WG 11, Document: JCTVC-J0411, 10th Meeting: Stockholm, SE, Jul. 5, 2012, 3 pp.

Clare et al., "Crosscheck of Syntax harmonisation of the I_PCM and TransQuantBypass modes (JCTVC-J0168)," Jul. 11-20, 2012; Joint Collaborative Team on Video Coding (JCT-VC) of ITU-T SG 16 WP 3 and ISO/IEC JTC 1/SC 29/WG 11, Document: JCTVC-J0426, 10th Meeting: Stockholm, SE, Jul. 9, 2012, 4 pp.

(56) References Cited

OTHER PUBLICATIONS

Coban et al., "Burst I_PCM Signalling," Jul. 11-20, 2012; Joint Collaborative Team on Video Coding (JCT-VC) of ITU-T SG 16 WP 3 and ISO/IEC JTC 1/SC 29/WG 11, Document: JCTVC-J0153, 10th Meeting: Stockholm, SE, Jul. 1, 2012, 6 pp.

Francois et al., "AHG11: Loop filtering control for I_PCM and TransQuantBypass modes," Jul. 11-20, 2012; Joint Collaborative Team on Video Coding (JCT-VC) of ITU-T SG 16 WP 3 and ISO/IEC JTC 1/SC 29/WG 11, Document: JCTVC-J0169r2, 10th Meeting: Stockholm, SE, Jul. 13, 2012, 9 pp.

Francois et al., "AHG11: Syntax harmonisation of the I_PCM and TransQuantBypass modes," Jul. 11-20, 2012; Joint Collaborative Team on Video Coding (JCT-VC) of ITU-T SG 16 WP 3 and ISO/IEC JTC 1/SC 29/WG 11, Document: JCTVC-J0168r1, 10th Meeting: Stockholm, SE, Jul. 9, 2012, 8 pp.

\* cited by examiner

UNIFICATION OF SIGNALING LOSSLESS CODING MODE AND PULSE CODE MODULATION (PCM) MODE IN VIDEO CODING

This application claims the benefit of U.S. Provisional Application No. 61/661,242, filed on Jun. 18, 2012, and U.S. Provisional Application No. 61/666,632, filed on Jun. 29, 2012, the entire contents of each of which are incorporated herein by reference.

TECHNICAL FIELD

This disclosure relates to video coding and, more particularly, signaling video coding modes.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling of lossless coding and pulse code modulation (PCM) coding modes in video coding. In some examples, the techniques may provide improved efficiency of signaling information associated with the coding modes through, for example, signaling or interpreting syntax elements used to signal lossless and PCM coding modes in conjunction with each other.

In one example, the techniques described in this disclosure are related to a method for decoding video data. The method includes decoding a first syntax element to determine whether a PCM coding mode is used for one or more video blocks, wherein the PCM coding mode refers to a mode that codes pixel values as PCM samples. The method further comprises decoding a second syntax element to indicate whether in-loop filtering is applied to the one or more video blocks. Responsive to the first syntax element indicating that the PCM coding mode is used, the method further comprises applying in-loop filtering to the one or more video blocks based at least in part on the second syntax element. The method also comprises decoding the one or more video blocks based at least in part on the first syntax element and the second syntax element.

In one example, the techniques described in this disclosure are related to a method for encoding video data. The method includes encoding a first syntax element to indicate whether a PCM coding mode is used for one or more video blocks, wherein the PCM coding mode refers to a mode that codes pixel values as PCM samples. The method also includes encoding a second syntax element to indicate whether in-loop filtering is applied to the one or more video blocks. Responsive to the first syntax element indicating that the PCM coding mode is used, the method further includes applying in-loop filtering to the one or more video blocks based at least in part on the second syntax element. The method also includes encoding the one or more video blocks based at least in part on the first syntax element and the second syntax element.

In another example, the techniques described in this disclosure are related to a video coding device. The video coding device includes a video coder configured to code a first syntax element that indicates whether a pulse code modulation (PCM) mode is used for the one or more video blocks, wherein the PCM coding mode refers to a mode that codes pixel values as PCM samples. The video coder is further configured to code a second syntax element that indicates whether in-loop filtering is applied to the one or more video blocks. The video coder is further configured to, responsive to the first syntax element indicating that the PCM coding mode is used, apply in-loop filtering to the one or more video blocks based at least in part on the second syntax element.

In yet another example, the techniques described in this disclosure are related to a computer-readable storage medium. The computer-readable storage medium has stored thereon instructions that, when executed, cause a processor of a device for coding video data to code a first syntax element that indicates whether a pulse code modulation (PCM) mode is used for the one or more video blocks, wherein the PCM coding mode refers to a mode that codes pixel values as PCM samples. The instructions further cause the processor to code a second syntax element that indicates whether in-loop filtering is applied to the one or more video blocks. The instructions further cause the processor to, responsive to the first syntax element indicating that the PCM coding mode is used, apply in-loop filtering to the one or more video blocks based at least in part on the second syntax element.

In another example, the techniques described in this disclosure are related to a video coding device. The video coding devices includes means for coding a first syntax element that indicates whether a pulse code modulation (PCM) mode is used for the one or more video blocks, wherein the mode refers to a PCM coding mode that codes pixel values as PCM samples. The video coding device further includes means for coding a second syntax element that indicates whether in-loop filtering is applied to the one or more video blocks. The video coding device further includes, responsive to the first syntax element indicating that the PCM coding mode is used, means for applying filtering to the one or more video blocks based at least in part on the second syntax element.

In one example, the techniques described in this disclosure are related to a method for decoding video data. The method includes decoding a first syntax element to determine whether a lossless coding mode is used for one or more video blocks or a PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples. The method further includes, responsive to the first syntax element indicating a true value, decoding a second syntax element that indicates which of the lossless coding mode or the PCM mode is used.

In another example, the techniques described in this disclosure are related to a method for encoding video data. The method includes encoding a first syntax element to determine whether a lossless coding mode is used for one or more video blocks or a PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples. The method further includes, responsive to the first syntax element indicating a true value, encoding a second syntax element to indicate which of the lossless coding mode or the PCM mode is used.

In another example, the techniques described in this disclosure are related to a video coding device. The video coding device includes a video coder configured to code a first syntax element that indicates whether a lossless coding mode is used for one or more video blocks or a PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples. The video coder is further configured to, responsive to the first syntax element indicating a true value, code a second syntax element that indicates which of the lossless coding mode or the PCM mode is used.

In yet another example, the techniques described in this disclosure are related to a computer-readable storage medium. The computer-readable storage medium has stored thereon instructions that, when executed, cause a processor of a device for coding video data to code a first syntax element that indicates whether a lossless coding mode is used for one or more video blocks or a PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples. The instructions further cause the processor to, responsive to the first syntax element indicating a true value, code a second syntax element that indicates which of the lossless coding mode or the PCM mode is used.

In another example, the techniques described in this disclosure are related to a video coding device. The video coding devices includes means for means for coding a first syntax element that indicates whether a lossless coding mode is used for one or more video blocks or a pulse code modulation (PCM) coding mode is used for the one or more video blocks, wherein the lossless coding mode refers to a mode that bypasses transform, quantization, and in-loop filtering in a coding process and wherein the PCM coding mode refers to a mode that codes pixel values as PCM samples. The video coding device further includes means for responsive to the first syntax element indicating a true value, means for coding a second syntax element that indicates which of the lossless coding mode or the PCM mode is used.

The details of one or more examples are set forth in the accompanying drawings and the description below. Other features, objects, and advantages will be apparent from the description and drawings, and from the claims.

DETAILED DESCRIPTION

Figure 1:
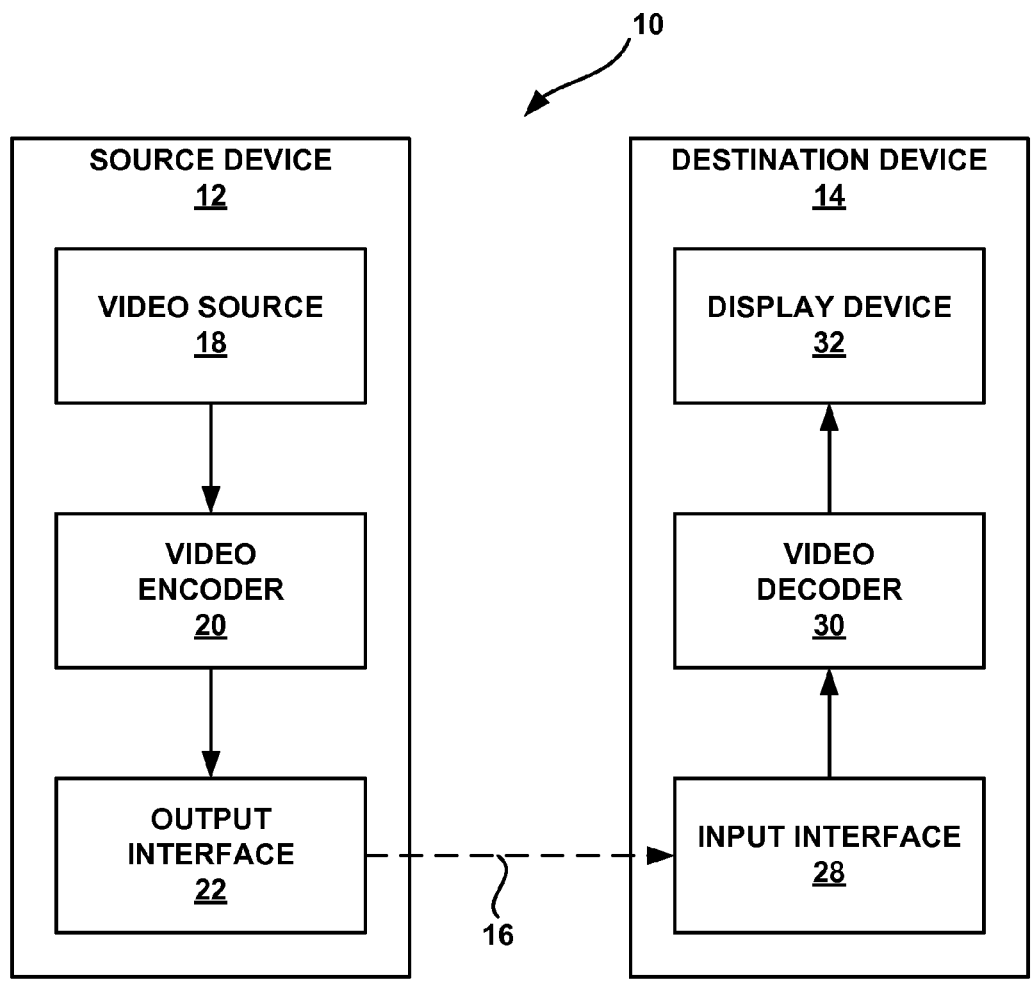
FIG. 1 is a block diagram illustrating an example video coding system that may be configured to utilize the techniques of this disclosure.

In general, this disclosure describes techniques for unifying the signaling of lossless coding and pulse code modulation (PCM) coding modes in video coding. More specifically, in some examples, the techniques of this disclosure signal, either jointly or in conjunction with one another, lossless and PCM modes for the same block size by using flags. The flags may be signaled at a coding unit (CU) level, and may be in a group of CUs for one or more video blocks. The techniques described herein improve efficiency and harmonize the signaling of lossless and PCM modes. The techniques define the interaction between a lossless coding mode flag and a PCM coding mode flag in order to harmonize and improve efficiency of signaling the flags. Some techniques described in this disclosure further define the interaction between the lossless coding mode flag, the PCM coding mode flag, and a third flag that indicates whether in-loop filtering is enabled.

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the HEVC standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks may be encoded using spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression in a video bitstream.

Working Draft 7 of HEVC (referred to herein as "HEVC WD7") introduced an explicit flag at the CU level to signal lossless coding. Lossless coding mode (also referred to herein as "lossless mode") may refer to a coding mode in which coding processes that introduce loss are bypassed. Transformation, quantization, and in-loop filtering are examples of coding processes that introduce loss to an encoded bitstream. Thus, lossless coding mode may bypass transform and quantization and in-loop filtering video coding processes. Document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012, which, as of Jun. 17, 2013, is downloadable from http://phenix.int-evry.fr/jct/doc_end_user/documents/9_Geneva/wg11/JCTVC-I1003-v6.zip.

Although the techniques included in this disclosure are described with respect to HEVC WD7, the techniques are also applicable to and suitable for the final HEVC draft (referred to as "HEVC Version 1") specification as well. For example, a burst PCM mode has been removed from the final HEVC (version 1) specification. Document JCTVC-L1003_v34, Bross et al., "High Efficiency Video Coding (HEVC) Text Specification Draft 10 (for FDIS & Last Call)," Joint Collaborative Team on Video Coding (JCT-VC) of ITU-T SG16 WP3 and ISO/IEC JTC1/SC29/WG11, 12$^{th}$ Meeting: Geneva, Switzerland, Jan. 14, 2013 to Jan. 23, 2013, which, as of Jun. 17, 2013, is downloadable from http://phenix.int-evry.fr/jct/doc_end_user/documents/12 Geneva/wg11/JCTVC-L1003-v34.zip.

In previous versions of the HEVC draft, before the 9$^{th}$ JCT-VC meeting that produced WD7, lossless coding was implicitly signaled. That is, lossless coding was used for a CU when the signaled quantization parameter (QP) value was the minimum allowable QP value (e.g., 0 for 8-bit main profile). During the 9$^{th}$ JCT-VC meeting in Geneva, Switzerland, the signaling scheme for the lossless coding mode was modified to explicitly signal the lossless coding mode. Instead of such previous implicit signaling (i.e., performing lossless coding when the signaled QP value was the minimum allowable QP value), the 9$^{th}$ JCT-VC meeting introduced an explicit flag at the coding unit (CU) level to signal lossless coding. A flag at the CU level (e.g., transquant_bypass_enable_flag) is introduced to enable the lossless coding mode.

When the lossless coding mode is enabled, then at the CU level, a flag (e.g., cu_transquant_bypass_flag) is signaled that indicates whether lossless coding mode is used for that particular CU. If cu_transquant_bypass_flag is 1 (e.g., a true value), all in-loop filtering is disabled. In-loop filtering may include deblocking, adaptive loop filter (ALF), and sample adaptive offset (SAO) processes. Transform and quantization is bypassed as well.

HEVC WD7 also includes an explicit flag at the SPS level to signal whether PCM mode is enabled or disabled (pcm_enabled_flag). The PCM coding mode is a coding mode that is different from the lossless coding mode mentioned above. PCM coding mode refers to a mode that codes pixel values as PCM samples. For example, samples are coded directly as PCM samples in PCM coding mode. In some examples, PCM mode may be lossy in which case certain number of lowest significant bits are discarded for each sample. In some examples, PCM coding mode may also be referred to as intra pulse code modulation (IPCM).

The PCM coding mode (also referred to herein as "PCM mode") can be enabled or disabled at the SPS level (e.g., by setting pcm_enabled_flag). If PCM mode is enabled, minimum and maximum CU sizes at which the PCM mode can be used are signaled. A CU level flag (pcm_flag) indicates whether the PCM mode is being used for a particular CU. A run-length of PCM mode block samples can also be signaled. Another flag (pcm_loop_filter_disable_flag) is used at the SPS level and indicates whether in-loop filtering should be applied to the PCM mode block.

The interaction between PCM coding mode and lossless coding mode is not well defined in HEVC WD7. For example, if the lossless coding mode as currently defined and PCM coding mode are enabled simultaneously, the PCM coding mode takes preference. Techniques of this disclosure include modifications which harmonize the signaling of lossless and PCM modes and the interaction with in-loop filters.

Three alternative techniques for harmonizing or unifying the signaling of lossless and PCM modes in an encoding and/or decoding process are described in this disclosure. A first technique includes using the syntax element cu_transquant_bypass_flag to enable in-loop filtering for PCM mode. In HEVC WD7, pcm_loop_filter_disable_flag may be set to enable or disable loop filtering for PCM coded blocks for an entire sequence of pictures. However, in order to enable or disable loop filtering for individual PCM coded video blocks, cu_transquant_bypass_flag can be used to determine or indicate that loop filtering is used for a particular PCM coded video block.

For example, if pcm_flag equals 0 and cu_transquant_bypass_flag is present and equal to 1, transform, quantization, and all loop filtering are bypassed for the "lossless" coding unit. Otherwise, if pcm_flag equals 0 and cu_transquant_bypass_flag is equal to 0, transform, quantization, and all loop filtering are performed for the coding unit. If pcm_flag equals 1 and cu_transquant_bypass_flag is present and equals 1, all loop filters are bypassed for the PCM coded block (that is, loop filters are not applied to the PCM code block). Otherwise, if cu_transquant_bypass_flag is not present or equals 0, the loop filters are applied to the PCM coded block.

The flag pcm_loop_filter_disable_flag may be removed from the SPS or not. If pcm_loop_filter_disable_flag is removed, loop filtering will not be enabled or disabled for PCM coded blocks for an entire sequence of pictures. If pcm_loop_filter_disable_flag is present and equal to 0, cu_transquant_bypass_flag continues to turn in-loop filtering on or off for PCM coded block samples. Otherwise, if pcm_loop_filter_disable_flag is present and equal to 1, cu_transquant_bypass_flag has no effect on in-loop filtering of PCM coded block samples and all in-loop filtering is disabled for the PCM coded block samples.

An alternative technique includes using and signaling PCM coding mode only when cu_transquant_bypass_flag is 0 or false. In HEVC WD7, PCM mode is signaled regardless of the value of cu_transquant_bypass_flag. That is, in HEVC WD7, the syntax element cu_transquant_bypass_flag is wasted when the video block uses PCM mode. Thus, by signaling PCM mode only when cu_transquant_bypass_flag is 0, the video coding process increases in efficiency and the bitstream size may be reduced.

A third alternative technique is described where the presence of one syntax element (cu_transquant_bypass_flag) defines a second syntax element (pcm_flag) to be interpreted as selecting lossless or PCM coding modes. As such, pcm_flag may be considered as at a hierarchically lower level than cu_transquant_bypass_flag. The flag pcm_flag is signaled only when cu_transquant_bypass_flag is equal to 1. In this technique, if a video block either uses PCM mode or lossless mode, cu_transquant_bypass_flag is set to 1. Next, pcm_flag will be signaled to indicate or read to determine whether PCM mode or lossless mode was applied for the video block. If pcm_flag is 1, then PCM mode is used. If pcm_flag is 0, lossless coding mode is used. In the case that cu_transquant_bypass_flag is 0, pcm_flag is not signaled and coding with transform, quantization, and in-loop filtering is performed for the video block.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). The HEVC standard is being developed by the Joint Collaborative Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 7" or "WD 7," is described in document JCTVC-11003, Bross et al., "High efficiency video coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012 which, as of Jun. 11, 2013, is downloadable from http://phenix.it-sudparis.eu/jct/doc_end_user/documents/9_Geneva/wg11/JCTVC-11003-v3.zip.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, may not be limited to any particular coding standard or technique. Other examples of video compression standards and techniques include MPEG-2, ITU-T H.263 and proprietary or open source compression formats such as VP8 and related formats, or extensions thereto.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

In accordance with this disclosure, video encoder 20 and video decoder 30 may be configured to implement one or more techniques of this disclosure. Techniques of this disclosure include modifications which harmonize the signaling of lossless and PCM coding modes and the interaction of these coding modes with in-loop filters.

A first technique includes using the syntax element cu_transquant_bypass_flag to enable in-loop filtering for PCM mode. In HEVC WD7, pcm_loop_filter_disable_flag may be set to enable or disable loop filtering PCM coded blocks for an entire sequence of pictures. However, in order to enable or disable loop filtering for individual PCM coded video blocks, cu_transquant_bypass_flag can be used to determine or indicate that loop filtering is used for a particular PCM coded video block.

For example, the syntax element cu_transquant_bypass_flag is signaled to enable in-loop filtering for PCM coding mode. If pcm_flag equals 0 and cu_transquant_bypass_flag is present and equal to 1, transform, quantization, and all loop filtering are bypassed for the "lossless" coding unit. For a CU that video encoder 20 did not encode with PCM coding mode but bypassed transform, quantization, and loop filtering for the CU, video encoder 20 signals pcm_flag as equal to 0 and cu_transquant_bypass_flag equal to 1. Otherwise, if video encoder 20 does not use PCM coding mode to encode the CU (e.g., pcm_flag equals 0), and performs transform, quantization, and loop filtering for the CU, video encoder 20 signals cu_transquant_bypass_flag equal to 0.

If video encoder 20 uses PCM coding mode to encode the CU (e.g., pcm_flag equals 1), and loop-filtering is not used on the PCM coded block samples, video encoder 20 signals cu_transquant_bypass_flag equal to 1. If video encoder 20 uses PCM coding mode to encode the CU (e.g., pcm_flag equals 1), and loop-filtering is used on the PCM coded block samples, video encoder 20 signals cu_transquant_bypass_flag equal to 0.

Similarly, if video decoder 30 determines that pcm_flag equals 0 and cu_transquant_bypass_flag is present and equal to 1 for an encoded CU, video decoder 30 decodes the encoded CU without inverse transformation, inverse quantization, or in-loop filtering for the encoded CU. Otherwise, if video decoder 30 determines that the encoded CU was not encoded with PCM coding mode (e.g., pcm_flag equals 0) and video decoder 30 determines the flag cu_transquant_bypass_flag is equal to 0, video decoder 30 performs inverse transform, inverse quantization, and in-loop filtering to decode the encoded CU.

Likewise, if video decoder 30 determines that the encoded CU was encoded with PCM coding mode (e.g., pcm_flag equals 1) and determines cu_transquant_bypass_flag is equal to 1, video decoder 30 decodes the encoded PCM mode CU without in-loop filtering for the encoded PCM mode CU. Otherwise, if video decoder 30 determines that the encoded CU was encoded with PCM coding mode (e.g., pcm_flag equals 1) but determines that cu_transquant_bypass_flag is equal to 0, video decoder 30 performs in-loop filtering to decode the encoded PCM mode CU.

In some examples, the flag pcm_loop_filter_disable_flag is removed from the SPS in the video coding specification. Thus, video encoder 20 would not signal pcm_loop_filter_disable_flag. However, if pcm_loop_filter_disable_flag is included in the specification and if video encoder 20 does signal pcm_loop_filter_disable_flag and it is equal to 0, the flag cu_transquant_bypass_flag may turn in-loop filtering on or off for PCM coded block samples. For example, when video decoder 30 reads pcm_loop_filter_disable_flag as equal to 0, video decoder 30 uses in-loop filtering on the PCM block samples based at least in part on the value of cu_transquant_bypass_flag.

In other examples where video encoder 20 does signal the flag pcm_loop_filter_disable_flag in the SPS and pcm_loop_filter_disable_flag is equal to 1 or true, cu_transquant_bypass_flag has no effect on in-loop filtering of PCM block samples and all in-loop filtering is disabled for the PCM coded block samples.

In a second alternative example, video encoder 20 signals pcm_flag only when cu_transquant_bypass_flag is 0 or false. Likewise, video decoder 30 determines whether cu_transquant_bypass_flag is 1 or true before deciding whether pcm_flag should be read. In HEVC WD7, if pcm_flag is 1 for a particular CU, PCM mode is used regardless of cu_transquant_bypass_flag. Thus, by signaling PCM mode only when cu_transquant_bypass_flag is 0, the video coding process is more efficient than in HEVC WD7, where PCM mode is signaled regardless of the value of cu_transquant_bypass_flag.

In a third alternative technique, the presence of cu_transquant_bypass_flag defines the meaning of pcm_flag as identifying whether the video block was encoded in lossless or PCM coding modes. The flag pcm_flag is signaled only when cu_transquant_bypass_flag is equal to 1. In this technique, if a video block either uses PCM mode or lossless mode (e.g., if transform, quantization, and in-loop filtering is bypassed for the video block), cu_transquant_bypass_flag is set to 1. The flag pcm_flag is signaled that indicates whether PCM mode or lossless mode was applied for the video block.

For example, video encoder 20 codes a video block using PCM mode or bypasses transform, quantization, and in-loop filtering for the video block (e.g., lossless coding mode), video encoder 20 signals cu_transquant_bypass_flag as equal to 1. Video encoder 20 signals the flag pcm_flag only when cu_transquant_bypass_flag is equal to 1. Video encoder 20 sets pcm_flag equal to 1 when video encoder 20 encoded the video block using PCM coding mode. Video encoder 20 sets pcm_flag equal to 0 when video encoder 20 encoded the video block using lossless coding mode. If video encoder 20 signals cu_transquant_bypass_flag as equal to 0, video encoder 20 does not signal pcm_flag and the video block is encoded in a lossy mode with transform, quantization, and in-loop filtering is applied.

Likewise, video decoder 30 decodes an encoded video block using PCM mode or bypasses inverse transform, inverse quantization and in-loop filtering (e.g., lossless coding mode) for the video block when video decoder 30 determines that cu_transquant_bypass_flag is equal to 1. Video decoder 30 reads the flag pcm_flag only after determining cu_transquant_bypass_flag is equal to 1. Video decoder 30 decodes the encoded video block using PCM coding mode when pcm_flag is equal to 1. Video decoder 30 decodes the encoded video block using lossless coding mode when pcm_flag is equal to 0. If video decoder 30 determines that cu_transquant_bypass_flag is equal to 0, video decoder 30 may not look for or read pcm_flag. In such an example, video decoder 30 decodes the video block using inverse transform, inverse quantization, and applies in-loop filtering.

Figure 2:
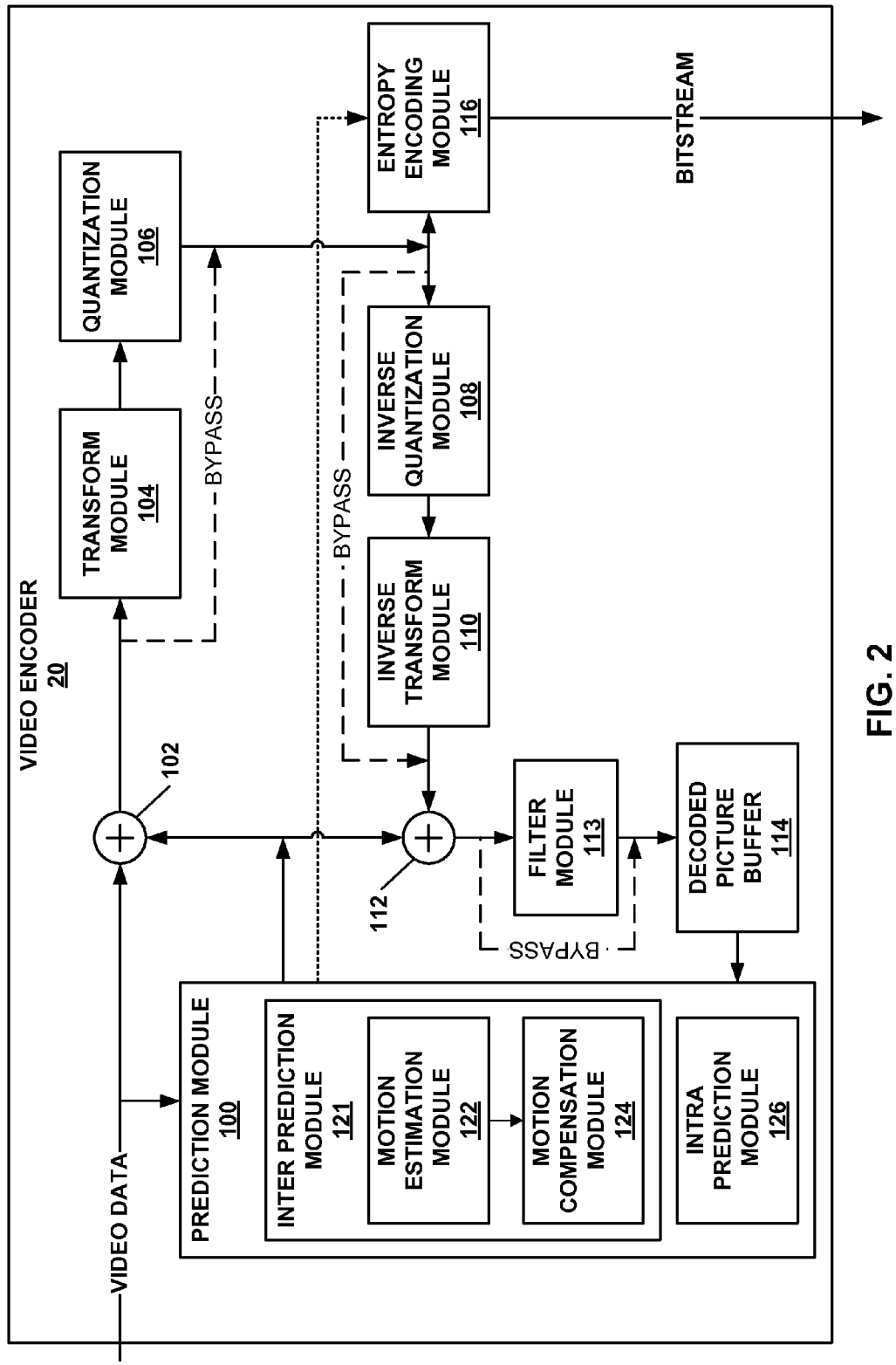
FIG. 2 is a block diagram illustrating an example video encoder that may be configured to implement the techniques of this disclosure.

FIG. 2 is a block diagram that illustrates an example video encoder 20 that can be configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation. With some coding modes, one or more of the units or modules shown in FIG. 2 may be bypassed, e.g., for lossless coding. One or more components, units or modules not specifically illustrated in FIG. 2 may also be used in some coding modes, e.g., to support direct coding of PCM samples, which may also be a type of lossless coding or some quantization may be applied to them by discarding a certain number of lowest significant bits from each sample.

Video encoder 20 may receive video data. Video encoder 20 may receive the video data from various sources. For example, video encoder 20 may receive the video data from video source 18 of FIG. 1 or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value. Samples may refer to pixel values or possibly another sample format used for video data representations.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU. In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

In some examples, video encoder 20 bypasses transform module 104 and quantization module 106 for one or more video blocks. When video encoder 20 bypasses transform module 104 and quantization module 106 for a video block, video encoder 20 does not perform transformation and quantization for that video block.

In examples where video encoder 20 bypasses transform module 104 and quantization module 106, video decoder 30 may similarly bypass inverse quantization module 108 and inverse transform module 110. Otherwise, inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. Filter module 113 may also perform other types of filtering (if desired), such as sample adaptive offset (SAO) filtering, adaptive loop filtering (ALF), or other types of in-loop or post loop filtering. In some examples, video encoder 20 bypasses filter module 113. In such an example, video encoder 20 does not perform in-loop filtering such as deblocking, SAO, or ALF filtering on the reconstructed video block.

After performing the one or more filtering operations or not, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Video encoder 20 may be configured to implement one or more of the techniques described herein as part of a video encoding process. In one technique described herein, video encoder 20 signals the syntax element cu_transquant_bypass_flag to enable in-loop filtering for PCM mode. Video encoder 20 encodes a first syntax element (e.g., pcm_flag) to indicate whether the PCM coding mode is used for one or more video blocks, wherein the PCM mode refers to a mode that codes pixel values as PCM samples. Video encoder 20 may also be configured to encode a second syntax element (e.g., cu_transquant_bypass_flag) to indicate whether in-loop filtering is applied when PCM coding mode is used and to indicate whether a lossless coding mode is used when PCM coding mode is not used for one or more video blocks, wherein the lossless coding mode refers to a mode that bypasses transform, quantization, and in-loop filtering in a coding process. Responsive to the first syntax element (e.g., pcm_flag) indicating that the PCM coding mode is used, video encoder 20 applies in-loop filtering based at least in part on the second syntax element (e.g., cu_transquant_bypass_flag). Video encoder 20 may also be configured to encode the second syntax element regardless of the first syntax element.

For example, if pcm_flag equals 0 and cu_transquant_bypass_flag is equal to 1, transform, quantization, and in-loop filtering are bypassed for the "lossless" coding unit. For a CU that video encoder 20 did not encode with PCM coding mode but bypassed transform, quantization, and in-loop filtering for the CU, video encoder 20 signals pcm_flag as equal to 0 and cu_transquant_bypass_flag equal to 1. Otherwise, if video encoder 20 did not use PCM coding mode to encode the CU (e.g., pcm_flag equals 0), and performs transform, quantization, and in-loop filtering for the CU, video encoder 20 signals cu_transquant_bypass_flag equal to 0.

If video encoder 20 uses PCM coding mode to encode the CU (e.g., pcm_flag equals 1), and does not perform in-loop filtering for the CU (e.g., bypassed), video encoder 20 signals cu_transquant_bypass_flag equal to 1. If video encoder 20 uses PCM coding mode to encode the CU (e.g., pcm_flag equals 1), and performs in-loop filtering for the CU (e.g., not bypassed), video encoder 20 signals cu_transquant_bypass_flag equal to 0. That is, when PCM coding mode is used, transform is always bypassed, quantization may or may not be bypassed and in-loop filtering is controlled by cu-transquant_bypass_flag.

In another example technique, video encoder 20 is configured to code a syntax element (e.g., cu_transquant_bypass_flag) to indicate whether a lossless coding mode is used for one or more video blocks, wherein the lossless coding mode refers to a mode that bypasses transform, quantization, and in-loop filtering in a coding process, and disable PCM mode for the one or more video blocks if the syntax element indicates that the lossless coding mode is used, wherein the PCM mode refers to a mode that codes pixel values as PCM samples.

For example, video encoder 20 signals pcm_flag only when cu_transquant_bypass_flag is 0 or false. In HEVC WD7, if pcm_flag is 1 for a particular CU, PCM mode is used regardless of cu_transquant_bypass_flag. Thus, video encoder 20 signaling PCM mode only when cu_transquant_bypass_flag is 0, in accordance with an example of this disclosure, improves the efficiency of the video coding process as compared with HEVC WD7, where PCM mode is signaled regardless of the value of cu_transquant_bypass_flag.

For example, video encoder 20 is configured to code a first syntax element (e.g., pcm_flag) to indicate whether a PCM coding mode is used for one or more video blocks. The PCM coding mode refers to a mode that codes pixel values of the one or more video blocks as PCM samples. Video encoder 20 is further configured to code a second syntax element (e.g., cu_transquant_bypass_flag) to indicate whether in-loop filtering is applied to the one or more video blocks. If the first syntax element indicates that the PCM coding mode is used, the second syntax element is interpreted to indicate whether or not to apply in-loop filtering.

In an alternative technique, video encoder 20 may use pcm_flag to indicate whether PCM coding mode or lossless coding mode is used for the one or more video blocks. In this example, the pcm_flag is treated as being at a hierarchically lower level than the cu_transquant_bypass_flag. That is, cu_transquant_bypass_flag controls both cu_transquant_bypass_flag and pcm_flag. Video encoder 20 signals whether the one or more video blocks are encoded using lossless coding mode or PCM coding mode based on a combination of the two flags, cu_transquant_bypass_flag and pcm_flag.

For example, if video encoder 20 signals cu_transquant_bypass_flag as equal to 1, this means that either lossless coding mode or PCM coding mode was used to encode the one or more video blocks. In order to identify which coding mode video encoder 20 used to encode the one or more video blocks, video encoder 20 signals pcm_flag. For example, video encoder 20 signals pcm_flag equal to 0 to indicate lossless coding mode was used. Similarly, video encoder 20 signals pcm_flag equal to 1 to indicate PCM coding mode was used. Thus, a lossless coding condition as well as a PCM coding condition is derived as a combination of the two flags. In other examples, different combinations of flags and values may be used to achieve similar functionalities.

For example, video encoder 20 is configured to code a first syntax element (e.g., cu_transquant_bypass_flag) to indicate whether a lossless coding mode is used for one or more video blocks or a pulse code modulation (PCM) mode is used for the one or more video blocks, wherein the lossless coding mode refers to a mode that bypasses transform, quantization and in-loop coding in a coding process and wherein the PCM mode refers to a mode that codes pixel values as PCM samples. If the first syntax element is set to true, video encoder 20 may be configured to code a second syntax element (e.g., pcm_flag) to indicate whether the lossless coding mode is used or the PCM mode is used. In this example, video encoder 20 may enable or disable an in-loop filtering operation based on the first syntax element, the second syntax element, and a third syntax element (e.g., pcm_loop disable_flag).

Figure 3:
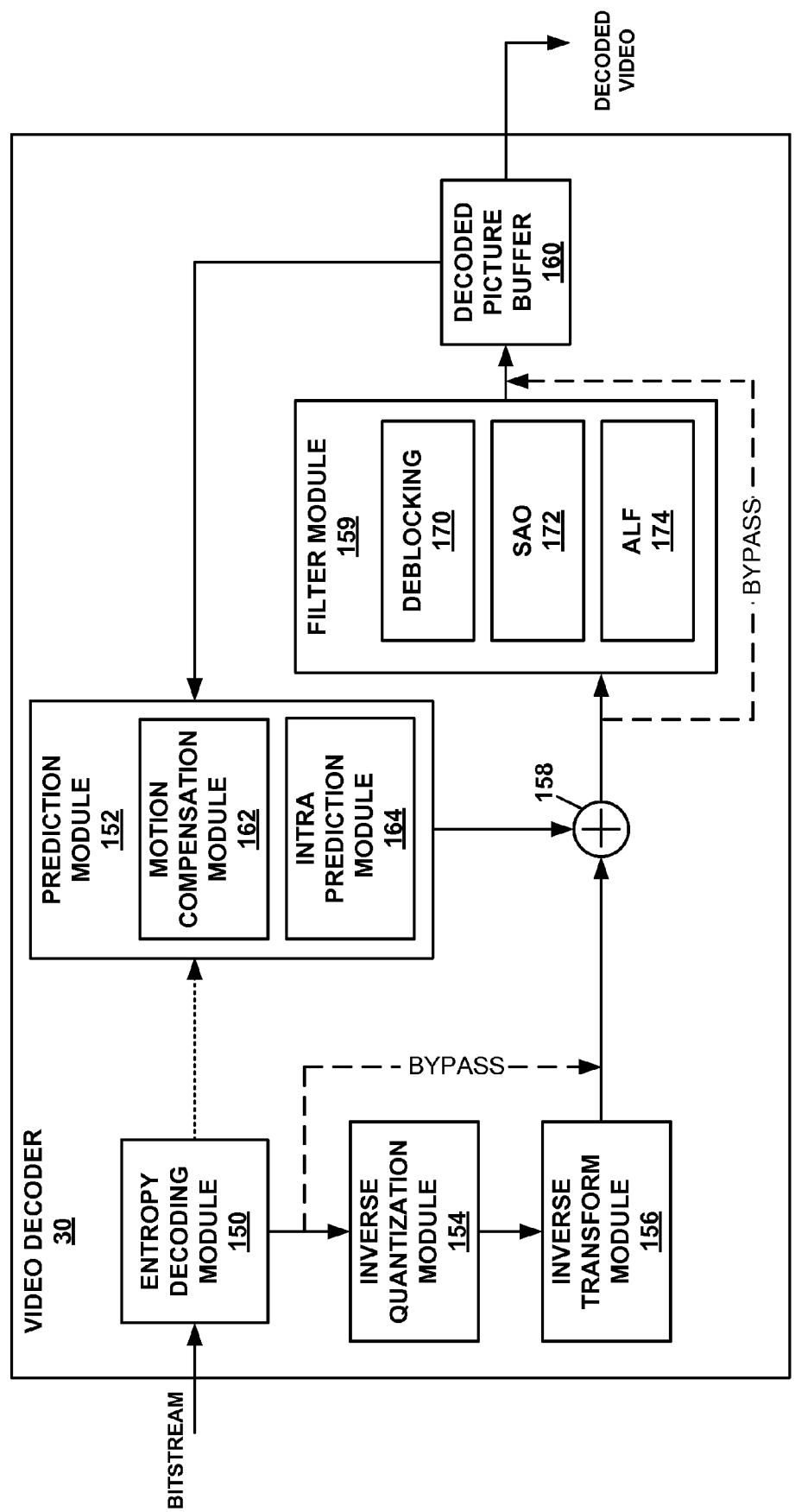
FIG. 3 is a block diagram illustrating an example video decoder that may be configured to implement the techniques of this disclosure.

FIG. 3 is a block diagram that illustrates an example video decoder 30 that can be configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

However, in some examples, video decoder 30 will determine that the one or more video blocks were encoded using lossless coding mode. In such an example, video decoder 30 will bypass inverse quantization module 154, inverse transform module 156 and filtering module 159 when decoding the one or more video blocks.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform one or more filtering operations. Filter module 159 includes a deblocking filter 170, a sample adaptive offset (SAO) filter 172, and may include an adaptive loop filtering (ALF) filter 174. Deblocking filter 170 performs a deblocking operation to reduce blocking artifacts associated with the CU. Filter module 159 may also perform other types of filtering (if desired), such as SAO filtering, ALF, or other types of in-loop or post loop filtering. Video decoder 30 may apply loop filtering based on one or more syntax elements signaled at a CU level for the one or more video blocks. In some examples, video decoder 30 bypasses filter module 159 and does not apply loop filtering to decode the video blocks.

After filter module 159 performs the one or more filtering operations, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

In accordance with this disclosure, video decoder 30 may be configured to implement one or more of the techniques described herein as part of a video decoding process. In one example, video decoder 30 is configured to decode a first syntax element (e.g., pcm_flag) to determine whether a PCM coding mode is used for one or more video blocks, wherein the mode refers to a mode that codes pixel values as PCM samples. Video decoder 30 is further configured to decode a second syntax element (e.g., cu_transquant_bypass_flag) to determine whether a lossless coding mode is used for one or more video blocks, wherein the lossless coding mode refers to a mode that bypasses transform, quantization, and in-loop filtering in a coding process. Responsive to the first syntax element indicating that the PCM coding mode is used, video decoder 30 applies in-loop filtering based at least in part on the second syntax element. Video decoder 30 may apply or bypass filtering module 159 based on the value of cu_transquant_bypass_flag.

For example, if pcm_flag equals 0 and cu_transquant_bypass_flag is present and equal to 1, video decoder 30 bypasses transform, quantization, and all in-loop filtering for the one or more video blocks. When video decoder 30 determines that pcm_flag is equal to 0 and cu_transquant_bypass_flag equal to 1, video decoder 30 decodes the one or more video blocks in the lossless coding mode, bypassing transform, quantization, and in-loop filtering for the one or more video blocks. Otherwise, if video decoder 30 determines that the one or more video blocks were not encoded with PCM coding mode (e.g., pcm_flag equals 0) and determines that cu_transquant_bypass_flag is equal to 0, video decoder 30 performs transform, quantization, and in-loop filtering in decoding the one or more video blocks.

If video decoder 30 determines PCM coding mode was used to encode the video blocks (e.g., pcm_flag equals 1) and that cu_transquant_bypass_flag equal to 1, video decoder 30 does not perform in-loop filtering (e.g., bypassed) for the video blocks. If video decoder 30 determines PCM coding mode was used to encode the video blocks (e.g., pcm_flag equals 1) and cu_transquant_bypass_flag is equal to 0, video decoder 30 performs in-loop filtering (e.g., not bypassed) to decode the one or more video blocks.

In another example, video decoder 30 is configured to decode a syntax element (e.g., cu_transquant_bypass_flag) to determine whether a lossless coding mode is used for one or more video blocks, wherein the lossless coding mode refers to a mode that bypasses transform, quantization, and in-loop filtering in a coding process, and disable PCM mode for the one or more video blocks if the syntax element indicates that the lossless coding mode is used, wherein the PCM mode refers to a mode that codes pixel values as PCM samples.

The syntax element may comprise a first syntax element, in which case video decoder 30 may also be configured to decode a second syntax element (e.g., pcm_flag) when the first syntax element indicates that the lossless coding mode is not used, the second syntax element indicates coding mode video encoder whether the PCM mode is used for the one or more video blocks. Video decoder 30 may also be configured to decode the second syntax element regardless of the first syntax element.

In another example, video decoder 30 is configured to decode a first syntax element (e.g., cu_transquant_bypass_flag) to indicate whether a lossless coding mode is used for one or more video blocks or a pulse code modulation (PCM) mode is used for the one or more video blocks. If the first syntax element is set to true or 1, video decoder 30 may be configured to decode a second syntax element (e.g., pcm_flag) to determine whether the video block was encoded with lossless coding mode or the PCM coding mode. Moreover, in this example, video decoder 30 may enable or disable an in-loop filtering operation based on the first syntax element, the second syntax element, and a third syntax element (e.g., pcm_loop_disable_flag).

Figure 4:
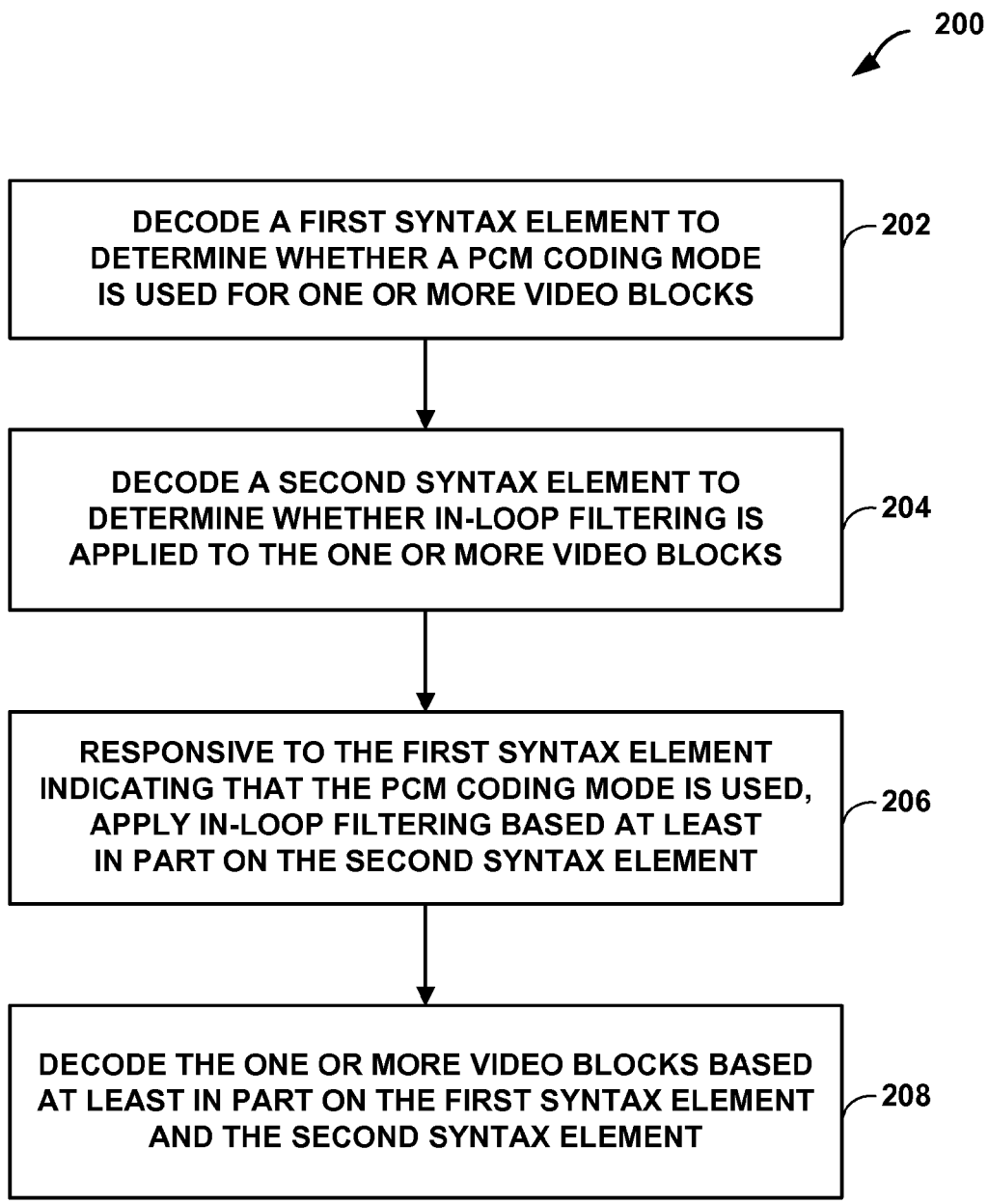
FIG. 4 is a flowchart illustrating an example method for decoding a syntax element to determine whether to apply filtering based on another syntax element for video data, according to techniques described in this disclosure.

FIG. 4 is a flowchart illustrating an example method 200 for decoding a syntax element to determine whether to apply filtering based on another syntax element for video data, according to techniques described in this disclosure. Method 200 may be performed by video decoder 30 of FIG. 3, for example. Method 200 utilizes the syntax element cu_transquant_bypass_flag to enable in-loop filtering for PCM mode.

In HEVC WD7, the signaling of lossless mode and PCM mode is performed at different video block sizes. The lossless coding mode is signaled at the CU level whereas the PCM coding mode can be used only for video block whose size satisfies the maximum and minimum video block size constraint. However, the size at which PCM and lossless modes are signaled may be unified. This can be accomplished by signaling both modes for a group of CUs. In this scenario the number of consecutive PCM mode blocks (signaled by num_subsequent_pcm) may need to be disabled. Unless noted otherwise, with the techniques below, it can be assumed that both the modes are being signaled for the same block size. Further harmonization is possible by signaling both transquant_bypass_enable_flag and pcm_enabled_flag in either the SPS or the PPS. In HEVC Version 1, num_subsequent_pcm is removed.

Method 200 may be performed by video decoder 30. As shown in FIG. 4, method 200 includes decoding a first syntax element to determine whether a pulse code modulation (PCM) coding mode is used for one or more video blocks, wherein the PCM mode refers to a mode that codes pixel values as PCM samples (202). The first syntax element may be, for example, pcm_flag. Method 200 further includes decoding a second syntax element to determine whether a lossless coding mode is used for one or more video blocks, wherein the lossless coding mode refers to a mode that bypasses transform, quantization, and in-loop filtering in a coding process (204). The second syntax element may be named, for example, cu_transquant_bypass_flag or more descriptively named as cu_transquant_loopfilter_bypass_flag.

Method 200 further includes, responsive to the first syntax element indicating that the PCM coding mode is used, applying filtering based at least in part on the second syntax element (206). Method 200 also includes decoding the one or more video blocks based at least in part on the first syntax element and the second syntax element (208).

In one alternative of this example, the techniques remove the pcm_loop_filter_disable_flag from the SPS that is included in HEVC WD7. In HEVC WD7, pcm_loop_filter_disable_flag may be set to enable or disable loop filtering for PCM coded blocks for an entire sequence of pictures. However, in order to enable or disable loop filtering for individual video blocks, cu_transquant_bypass_flag can be used to determine or indicate that loop filtering is used for a particular video block.

In-loop filtering for the PCM mode coded blocks is enabled or disabled using the cu_transquant_bypass_flag as follows. In this example, pcm_flag and cu_transquant_bypass_flag can be 1 at the same time. If this happens, the cu_transquant_bypass_flag is used to enable or disable in-loop filtering for PCM mode blocks at a block level instead of over the entire sequence. Thus, whether in-loop filtering will be applied to the PCM coded block will depend on the value of cu_transquant_bypass_flag. The following table (TABLE 1) shows the possible combinations of pcm_flag and cu_transquant_bypass_flag, with the resulting in-loop filtering:

TABLE 1

| pcm_flag | cu_transquant_bypass_flag | In-loop filtering |
| --- | --- | --- |
| 0 | 0 | enabled |
| 0 | 1 | disabled |
| 1 | 0 | enabled |
| 1 | 1 | disabled |

In an example according to TABLE 1 above, if pcm_flag equals 0 and cu_transquant_bypass_flag is present (if transquant_bypass_enable_flag equals 1), then cu_transquant_bypass_flag equal to 1 means that video decoder 30 bypasses the transform, quantization, and all in-loop filters for the "lossless" coding unit, otherwise, video decoder 30 bypasses none of the former for the coding unit. If pcm_flag equals 1 and cu_transquant_bypass_flag is present (if transquant_bypass_enable_flag equals 1), then, as TABLE 1 illustrates, video encoder 20 bypasses all in-loop filters for the PCM coded block (actually transform is also not applied to PCM, quantization may or may not be applied), otherwise, video encoder 20 applies the in-loop filters to the PCM coded block.

Note that the cu_transquant_bypass_flag may be renamed cu_transquant_loopfilter_bypass_flag to more accurately reflect its functionality. In order to have the cu_transquant_loopfilter_bypass_flag signaled for PCM mode, the condition based on the transquant_bypass_enable_flag is modified to "if (transquant_bypass_enable_flag or pcm_flag)." In addition, video encoder 20 places the signaling of the cu_transquant_loopfilter_bypass_flag towards the end of the coding unit syntax, but before the "no_residual_data_flag." In one example, this may be required for the pcm_flag to be available. Note that in "PCM burst mode," multiple PCM video blocks may be signaled together. In this case, only one cu_transquant_loopfilter_bypass_flag is signaled for all consecutive PCM blocks and the flag value applies to all consecutive PCM video blocks.

The following table (TABLE 2) illustrates the SPS syntax change (in <deleted> </deleted> tags) for the examples where pcm_loop_filter_disable_flag is removed from the SPS, which may show the removal of operations from processes of the HEVC WD7. In examples where pcm_loop_filter_disable_flag is not removed, the changes illustrated in TABLE 2 do not apply.

TABLE 2

...
<deleted> if( pcm_enabled_flag ) </deleted>
<deleted> pcm_loop_filter_disable_flag </deleted>    <deleted> u(1) </deleted>
...

The following table (TABLE 3) illustrates the coding unit syntax change (in <changed> </changed> tags), versus versions of the HEVC working draft as of the date of filing of the present disclosure:

TABLE 3

| coding_unit( x0, y0, log2CbSize ) { | Descriptor |
|---|---|
| ..... | |
|   if( transquant_bypass_enable_flag <changed>90 \|\| pcm_flag </changed> | |
| ) { | |
|     cu_transquant_loopfilter_bypass_flag | ae(v) |
|   } <changed>Note: cu_transquant_loopfilter_bypass_flag is moved towards the end of coding unit syntax, before the "no residual_data_flag"</changed> | |
|   if( !pcm_flag) { | |
|     if( PredMode != MODE_INTRA && | |
|      !(PartMode = = PART_2Nx2N && merge_flag[x0][y0]) ) | |
|      no_residual_data_flag | ae(v) |
| ..... | |

Alternatively, the pcm_loop_filter_disable_flag may be signaled in the SPS (as it is in HEVC WD7), or at a lower level such as the PPS or slice header. In such a case, if pcm_loop_filter_disable_flag equals 0, then the cu_transquant_bypass_flag may turn the in-loop filtering (deblocking, SAO, ALF, etc.) on or off for PCM coded block samples. Otherwise, if pcm_loop_filter_disable_flag equals 1, then the cu_transquant_bypass_flag does not affect in-loop filtering of PCM coded block samples and all in-loop filtering is disabled for PCM coded block samples. The following table (TABLE 4) summarizes the possible flag combinations:

TABLE 4

| pcm_loop_filter_disable_flag | pcm_flag | cu_transquant_bypass_flag | In-loop filtering |
|---|---|---|---|
| 0 | 0 | 0 | enabled |
| 0 | 0 | 1 | disabled |
| 0 | 1 | 0 | enabled |
| 0 | 1 | 1 | disabled |
| 1 | 0 | 0 | enabled |
| 1 | 0 | 1 | disabled |
| 1 | 1 | 0 | disabled |
| 1 | 1 | 1 | disabled |

The following tables (TABLE 5) summarize the syntax changes (in <changed> </changed> tags):

TABLE 5

| prediction_unit( x0, y0, log2CbSize) { | Descriptor |
|---|---|
|   if( skip_flag[ x0 ][ y0 ] ) { | |
|     if( MaxNumMergeCand > 1 ) | |
|       merge_idx[ x0 ][ y0 ] | ae(v) |
|   } else if( PredMode = = MODE_INTRA ) { | |
|     if( PartMode = = PART_2Nx2N && pcm_enabled_flag && | |
|       log2CbSize >= Log2MinIPCMCUSize && | |
|       log2CbSize <= Log2MaxIPCMCUSize && | |
|       <changed> ( !pcm_loop_filter_disable_flag \|\| | |
| (pcm_loop_filter_disable_flag && !cu_transquant_bypass_flag) ) | |
| </changed> | |
|       pcm_flag | ae(v) |
| ... | |

In method 200, decoding the one or more video blocks may further comprise decoding the one or more using PCM coding mode and in-loop filtering in response to the first syntax element indicating that the PCM coding mode is used and the second syntax element indicating that the lossless coding mode is used.

In examples where cu_transquant_loopfilter_bypass_flag is included as a syntax element, cu_transquant_loopfilter_bypass_flag is located towards an end of the CU syntax but before a no_residual_data_flag syntax element.

Method 200 may further include decoding a third syntax element (pcm_loop_filter_disable_flag) to determine whether filtering is enabled. Responsive to the third syntax element indicating that filtering is enabled, method 200 includes applying filtering based at least in part on the second syntax element. Likewise, method 200 includes responsive to the third syntax element indicating that filtering is disabled, disabling filtering for one or more video blocks that have PCM coding mode. The third syntax element may be a pcm_loop_filter_disable_flag flag in one of a sequence parameter set (SPS), picture parameter set (PPS), and a slice header of the one or more video blocks. If pcm_loop_filter_disable_flag is present and equal to 0, cu_transquant_bypass_flag continues to turn in-loop filtering on or off for PCM block samples. Otherwise, if pcm_loop_filter_disable_flag is present and equal to 1, cu_transquant_bypass_flag has no affect on in-loop filtering of PCM block samples and all in-loop filtering is disabled for the PCM block samples.

Figure 5:
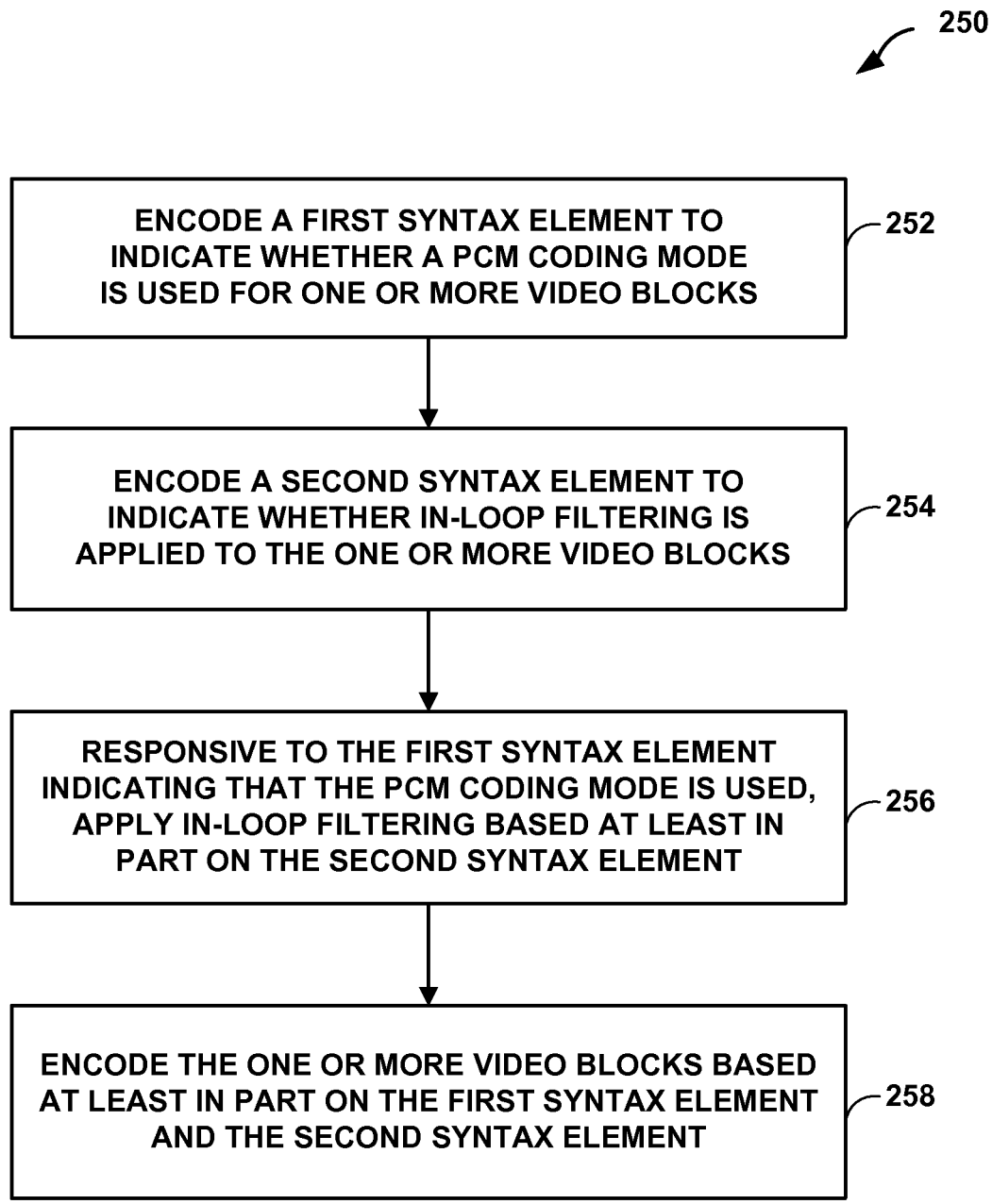
FIG. 5 is a flowchart illustrating an example method for encoding a syntax element to indicate whether to apply filtering based on another syntax element for video data, according to techniques described in this disclosure.

FIG. 5 is a flowchart illustrating an example method 250 for encoding a syntax element to indicate whether to apply filtering based on another syntax element for video data, according to techniques described in this disclosure. Method 250 may be performed by video encoder 20 of FIG. 2, for example. Method 200 utilizes the syntax element cu_transquant_bypass_flag to enable in-loop filtering for PCM mode.

Method 250 includes encoding a first syntax element to indicate whether a PCM coding mode is used for one or more video blocks, wherein the mode refers to a mode that codes pixel values as PCM samples (252). For example, video encoder 20 may encode pcm_flag to indicate that PCM coding mode was used to encode the one or more video blocks. Method 250 further includes encoding a second syntax element to indicate whether a lossless coding mode is used for one or more video blocks, wherein the lossless coding mode refers to a mode that bypasses transform, quantization, and in-loop filtering in a coding process (254). For example, video encoder 20 may encode cu_transquant_bypass_flag or cu_transquant_loopfilter_bypass_flag to indicate that lossless coding mode was used to encode the one or more video blocks.

Method 250 may further include applying filtering based at least in part on the second syntax element responsive to the first syntax element indicating that the PCM coding mode is used (256). Method 250 may further include encoding the one or more video blocks based at least in part on the first syntax element and the second syntax element (258). For example, video encoder 20 may encode one or more video blocks using PCM mode or lossless coding mode, and reflect the coding mode in the signaled syntax elements. Video encoder 20 may also encode the one or more video blocks using filtering.

In some examples, if the first syntax element indicates that the PCM coding mode is used and the second syntax element indicates that the lossless coding mode is used, then PCM mode is used and in-loop filtering is enabled. The first syntax element may be pcm_flag in a CU syntax level and the second syntax element may be a cu_transquant_loopfilter_bypass_flag syntax element in the CU syntax level. Video encoder 20 may locate the cu_transquant_loopfilter_bypass_flag syntax element towards an end of the CU syntax but before a no_residual_data_flag syntax element.

Method 250 may further comprise encoding a third syntax element to indicate whether filtering is enabled. The third syntax element may be pcm_loop_filter_disable_flag. Responsive to the third syntax element indicating that filtering is enabled, method 250 may include applying filtering based at least in part on the second syntax element. Further, method 250 may include, responsive to the third syntax element indicating that filtering is disabled, disabling filtering for one or more video blocks that have PCM coding mode. In some examples, the third syntax element includes a pcm_loop_filter_disable_flag syntax element in one of a sequence parameter set (SPS), picture parameter set (PPS), and a slice header of the one or more video blocks.

Figure 6:
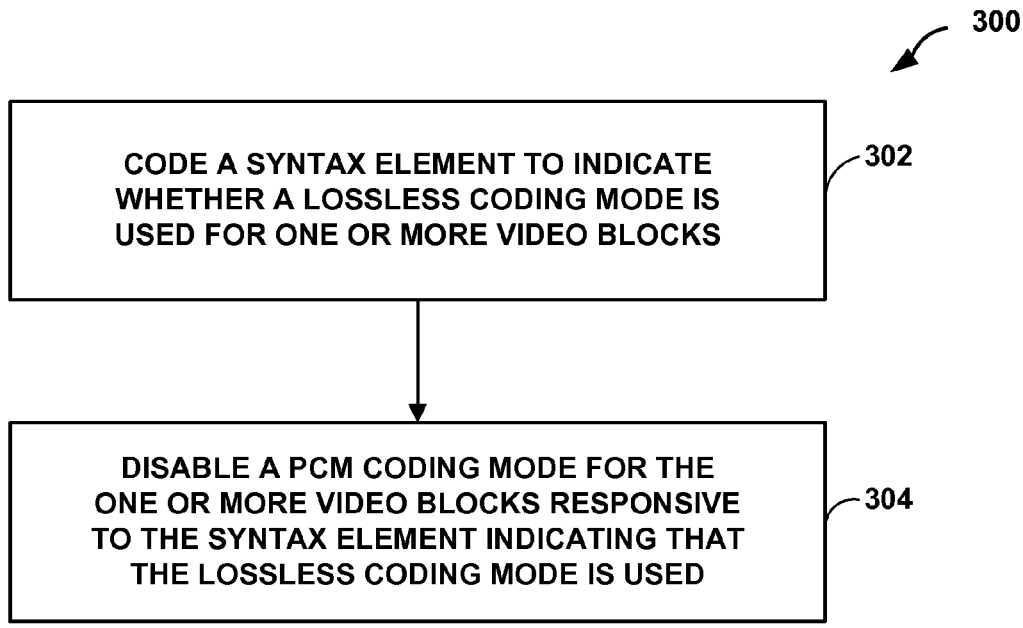
FIG. 6 is a flowchart illustrating an example method for coding syntax element indicating use of a pulse code modulation (PCM) coding mode based on a syntax element indicating use of a lossless coding mode for video data, according to techniques described in this disclosure.

FIG. 6 is a flowchart illustrating an example method 300 for coding syntax element indicating use of a pulse code modulation (PCM) coding mode based on a syntax element indicating use of a lossless coding mode for video data, according to techniques described in this disclosure. Method 300 may be performed by video encoder 20 of FIG. 2 or video decoder 30 of FIG. 3, for example.

First, as mentioned previously, in HEVC WD7, if for a particular CU the pcm_flag is 1, PCM mode is used irrespective of the value of the cu_transquant_bypass_flag. In this sense, cu_transquant_bypass_flag is wasted when the video block is encoded with PCM mode. To address this, techniques are proposed in which the PCM mode can be used only when cu_transquant_bypass_flag is 0. Thus, consistent with the table (TABLE 6) below, in the syntax table 7.3.7 "prediction unit syntax" of HEVC, a check for zero value of cu_transquant_bypass_flag may be added for a video decoder 30 to decide whether pcm_flag should be read. It should be noted that if transquant_bypass_enable_flag is 0, the value of cu_transquant_bypass_flag can be inferred to be 0.

TABLE 6

| prediction_unit( x0, y0, log2CbSize ) { | Descriptor |
|---|---|
|   if( skip_flag[ x0 ][ y0 ] ) { | |
|     if( MaxNumMergeCand > 1 ) | |
|       merge_idx[ x0 ][ y0 ] | ae(v) |
|   } else if( PredMode = = MODE_INTRA ) { | |

TABLE 6-continued

```
if( PartMode = = PART_2Nx2N && pcm_enabled_flag &&
    log2CbSize >= Log2MinIPCMCUSize &&
    log2CbSize <= Log2MaxIPCMCUSize <changed> &&
    !cu_transquant_bypass_flag </changed>)
    pcm_flag                                           ae(v)
...
```

The added condition is shown in TABLE 6 in <changed></changed> tags). Thus, video encoder 20 signals the first cu_transquant_bypass_flag in the encoded bitstream. If this flag is 1 then PCM mode cannot be used and hence, video encoder 20 does not signal pcm_flag. If cu_transquant_bypass_flag is 0, then PCM mode can be used and this is signaled via the pcm_flag. This modification can be made in HEVC WD 7 draft or when the lossless mode and the PCM mode are signaled at the same block size as described above.

Turning back to FIG. 6, method 300 includes coding a syntax element that indicates whether a lossless coding mode is used for one or more video blocks, wherein the lossless coding mode refers to a mode that bypasses transform, quantization, and in-loop filtering in a coding process (302). The syntax element may be a cu_transquant_bypass_flag flag in a coding unit (CU) syntax level. For example, video encoder 20 may encode cu_transquant_bypass_flag to indicate whether a lossless coding mode is used for one or more video blocks. Video decoder 30, on the other hand, may decode cu_transquant_bypass_flag to determine whether a lossless coding mode is used for one or more video blocks.

Method 300 further includes disabling a PCM coding mode for the one or more video blocks responsive to the syntax element indicating that the lossless coding mode is used, wherein the PCM coding mode refers to a mode that codes pixel values as PCM samples (304). For example, video encoder 20 may disable PCM coding mode when video encoder 20 encoded the one or more video blocks using lossless coding mode. Video decoder 30, on the other hand, may not even read pcm_flag when video decoder 30 determines that cu_transquant_bypass_flag is equal to 1. Instead, if cu_transquant_bypass_flag is equal to 1, video decoder 30 may disregard pcm_flag.

Considering the syntax element as a first syntax element, method 300 may further include coding a second syntax element responsive to the first syntax element indicating that the lossless coding mode is not used, wherein the second syntax element indicates whether the PCM coding mode is used for the one or more video blocks. The second syntax elements may be a pcm_flag flag in the CU syntax level.

Method 300 may further include coding the one or more video blocks according to the PCM coding mode responsive to the first syntax element indicating that the lossless coding mode is used and the second syntax element indicating that the PCM coding mode is used.

Figure 7:
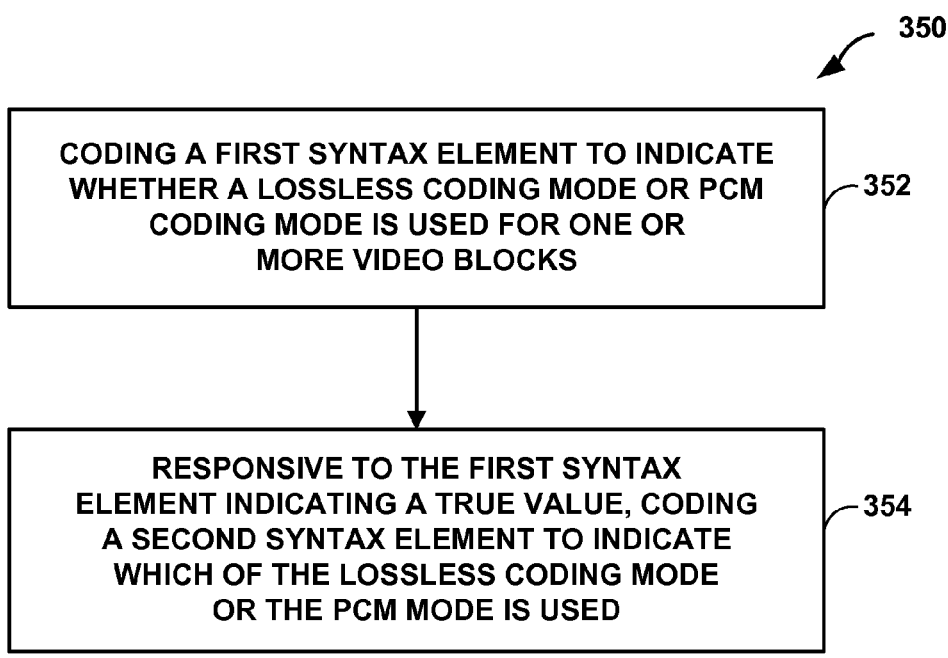
FIG. 7 is a flowchart illustrating an example method for using a PCM coding mode syntax element in conjunction with a lossless coding mode syntax element to determine whether to apply the PCM coding mode or the lossless coding mode for video data, according to techniques described in this disclosure.

FIG. 7 is a flowchart illustrating an example method 350 for using a PCM coding mode syntax element in conjunction with a lossless coding mode syntax element to determine whether to apply the PCM coding mode or the lossless coding mode for video data, according to techniques described in this disclosure. Method 350 may be performed by video encoder 20 or video decoder 30.

In this example, the PCM mode is dependent on the signaling of the lossless coding mode. Thus if a video block either uses PCM mode or if transform, quantization, and in-loop filtering is bypassed for the video block, the cu_transquant_bypass_flag is set to 1. The pcm_flag is signaled only when cu_transquant_bypass_flag is 1. If the pcm_flag is 1, the PCM mode is used. If pcm_flag is 0, lossless coding mode is used. If cu_transquant_bypass_flag is 0, pcm_flag is not signaled and normal coding with transform, quantization, and in-loop filtering is performed. The in-loop filtering is enabled or disabled by video encoder 20 or video decoder 30, as applicable, as shown in the following table (TABLE 7):

TABLE 7

| pcm_loop_disable_flag | pcm_flag | cu_transquant_bypass_flag | In-loop filtering |
|---|---|---|---|
| 0 | 0 | 0 | enabled |
| 0 | 0 | 1 | disabled |
| 0 | 1 | 0 | N/A |
| 0 | 1 | 1 | enabled |
| 1 | 0 | 0 | enabled |
| 1 | 0 | 1 | disabled |
| 1 | 1 | 0 | N/A |
| 1 | 1 | 1 | disabled |

The rows of TABLE 7 where in-loop filtering is deemed N/A cannot occur, since in this example, the pcm_flag is signaled only when cu_transquant_bypass_flag is 1. It should be noted that if transquant_bypass_enable_flag is 0, the value of cu_transquant_bypass_flag is inferred to be 0.

Turning to FIG. 7, method 350 includes coding a first syntax element that indicates whether a lossless coding mode is used for one or more video blocks or a PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples (352). Responsive to the first syntax element indicating a true value, method 350 includes coding a second syntax element that indicates whether the lossless coding mode is used or the PCM mode is used (354), i.e., which of the lossless coding mode or PCM mode is used. Hence, the first syntax element indicates that one of the lossless coding mode or PCM mode is used, whereas the second syntax element indicates which of the lossless coding mode or PCM mode is used.

For example, video encoder 20 encodes cu_transquant_bypass_flag to indicate whether lossless coding mode or PCM coding mode is used for the one or more video blocks. If so, that is, cu_transquant_bypass_flag equals 1, video encoder 20 encodes pcm_flag to indicate whether lossless coding mode or PCM coding mode was used. If pcm_flag equals 1, then video encoder 20 encoded the one or more video blocks using PCM coding mode. If pcm_flag equals 0, then video encoder 20 encoded the one or more video blocks using lossless coding mode. If lossless coding mode or PCM coding mode is not used, video encoder 20 does not encode pcm_flag.

Likewise, video decoder 30 decodes cu_transquant_bypass_flag to determine whether lossless coding mode or PCM coding mode is used for the one or more video blocks. If so, that is, cu_transquant_bypass_flag equals 1, video decoder 20 decodes or reads pcm_flag to determine whether lossless coding mode or PCM coding mode was used. If not, video decoder 30 does not parse for the pcm_flag because it will not be in the bitstream. If pcm_flag equals 1, then video decoder 30 decodes the one or more video blocks using PCM coding mode. If pcm_flag equals 0, then video decoder 30 decodes the one or more video blocks using lossless coding mode.

Method 350 may further include coding a third syntax element that indicates whether an in-loop filtering operation is enabled for PCM coded blocks. In-loop filtering is enabled or disabled based on the first syntax element, the second syntax element, and the third syntax element. In some examples, the first syntax element is the cu_transquant_bypass_flag syntax element, the second syntax element is the pcm_flag syntax element, and the third syntax element is the pcm_loop_disable_flag syntax element. In some examples, all three syntax elements may be coded at the CU syntax level.

In another example, method 350 may further include coding the one or more video blocks with transform and quantization processes and not coding the second syntax element responsive to the first syntax element indicating a false value.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In still other examples, this disclosure may be directed to a computer-readable storage medium that stores compressed video data, wherein the video data is compressed according to one or more of the techniques described herein. The data structures stored on the computer readable medium may include syntax elements that define the video data that is compressed according to one or more of the techniques described herein.

Various examples have been described. These and other examples are within the scope of the following claims.

What is claimed is:

1. A method of decoding video data, the method comprising:
    decoding a first syntax element, wherein the first syntax element indicates that a pulse code modulation (PCM) coding mode is used for a first video block of a plurality of video blocks, wherein the PCM coding mode refers to a mode that codes pixel values as PCM samples;
    decoding a second syntax element, wherein the second syntax element indicates that in-loop filtering is applied to the first video block;
    applying in-loop filtering to the first video block based at least in part on the second syntax element;
    decoding the first video block based at least in part on the first syntax element and the second syntax element;
    decoding a third syntax element, wherein the third syntax element indicates that the PCM coding mode is used for a second video block of the plurality of video blocks;
    decoding a fourth syntax element, wherein the fourth syntax element indicates that in-loop filtering is not applied to the second video block; and
    decoding the second video block based at least in part on the third syntax element and the fourth syntax element, wherein in-loop filtering is not applied to the second video block.

2. The method of claim 1, wherein the first syntax element comprises a pcm_flag syntax element in a coding unit (CU) syntax level and wherein the second syntax element comprises a cu_transquant_loopfilter_bypass_flag syntax element in the CU syntax level.

3. The method of claim 2, wherein the cu_transquant_loopfilter_bypass_flag syntax element is located towards an end of the CU syntax level but before a no_residual_data_flag syntax element.

4. The method of claim 1, further comprising:
    decoding a fifth syntax element (pcm_loop_filter_disable_flag) to determine whether filtering is enabled;

responsive to the fifth syntax element indicating that filtering is enabled, applying the filtering based at least in part on the second syntax element; and responsive to the fifth syntax element indicating that filtering is disabled, disabling filtering for one or more video blocks that have the PCM coding mode.

5. The method of claim 4, wherein the fifth syntax element comprises a pcm_loop_filter_disable_flag syntax element in one of a sequence parameter set (SPS), picture parameter set (PPS), and a slice header of the one or more video blocks.

6. The method of claim 1, further comprising:
receiving the video data at a receiver of a wireless communication device;
storing the video data in a memory of the wireless communication device; and
processing the video data on one or more processors of the wireless communication device.

7. The method of claim 6, wherein the wireless communication device comprises a wireless telephone handset and wherein receiving the video data at the receiver of the wireless communication device comprises demodulating, according to a wireless communication standard, a signal comprising the video data.

8. A method of encoding video data, the method comprising:
encoding a first syntax element, wherein the first syntax element indicates that a pulse code modulation (PCM) coding mode is used for a first video block of a plurality of video blocks, wherein the PCM coding mode refers to a mode that codes pixel values as PCM samples;
encoding a second syntax element, wherein the second syntax element indicates that in-loop filtering is applied to the first video block;
applying in-loop filtering to the first video block based at least in part on the second syntax element;
encoding the first video block based at least in part on the first syntax element and the second syntax element;
encoding a third syntax element, wherein the third syntax element indicates that the PCM coding mode is used for a second video block of the plurality of video blocks;
encoding a fourth syntax element, wherein the fourth syntax element indicates that in-loop filtering is not applied to the second video block; and
encoding the second video block based at least in part on the third syntax element and the fourth syntax element, wherein in-loop filtering is not applied to the second video block.

9. The method of claim 8, wherein the first syntax element comprises a pcm_flag syntax element in a coding unit (CU) syntax level and wherein the second syntax element comprises a cu_transquant_loopfilter_bypass_flag syntax element in the CU syntax level.

10. The method of claim 9, wherein the cu_transquant_loopfilter_bypass_flag syntax element is located towards an end of the CU syntax level but before a no_residual_data_flag syntax element.

11. The method of claim 8, further comprising:
encoding a fifth syntax element (pcm_loop_filter_disable_flag) to indicate whether filtering is enabled;
responsive to the fifth syntax element indicating that filtering is enabled, applying filtering based at least in part on the second syntax element; and
responsive to the fifth syntax element indicating that filtering is disabled, disabling filtering for one or more video blocks that have the PCM coding mode.

12. The method of claim 11, wherein the fifth syntax element comprises a pcm_loop_filter_disable_flag syntax element in one of a sequence parameter set (SPS), picture parameter set (PPS), and a slice header of the one or more video blocks.

13. A video coding device comprising:
a video data memory storing a plurality of video blocks; and
a video coder configured to:
code a first syntax element, wherein the first syntax element indicates that a pulse code modulation (PCM) coding mode is used for a first video block of the plurality of video blocks, wherein the PCM coding mode refers to a mode that codes pixel values as PCM samples;
code a second syntax element, wherein the second syntax element indicates that in-loop filtering is applied to the first video block;
applying in-loop filtering to the first video block based at least in part on the second syntax element;
code the first video block based at least in part on the first syntax element and the second syntax element;
code a third syntax element, wherein the third syntax element indicates that the PCM coding mode is used for a second video block of the plurality of video blocks;
code a fourth syntax element, wherein the fourth syntax element indicates that in-loop filtering is not applied to the second video block; and
code the second video block based at least in part on the third syntax element and the fourth syntax element, wherein in-loop filtering is not applied to the second video block.

14. The video coding device of claim 13, wherein the first syntax element comprises a pcm_flag syntax element in a coding unit (CU) syntax level and wherein the second syntax element comprises a cu_transquant_loopfilter_bypass_flag syntax element in the CU syntax level.

15. The video coding device of claim 14, wherein the cu_transquant_loopfilter_bypass_flag syntax element is located towards an end of the CU syntax level but before a no_residual_data_flag syntax element.

16. The video coding device of claim 11, wherein the video coder is configured to:
code a fifth syntax element (pcm_loop_filter_disable_flag) that indicates whether filtering is enabled;
responsive to the fifth syntax element indicating that filtering is enabled, apply filtering based at least in part on the second syntax element; and
responsive to the fifth syntax element indicating that filtering is disabled, disable filtering for one or more video blocks that have the PCM coding mode.

17. The video coding device of claim 16, wherein the fifth syntax element comprises a pcm_loop_filter_disable_flag syntax element in one of a sequence parameter set (SPS), picture parameter set (PPS), and a slice header of the one or more video blocks.

18. The video coding device of claim 13, wherein the video coding device is a video decoder, wherein to code the first syntax element the video decoder is configured to decode the first syntax element, wherein to code the second syntax element the video decoder is configured to decode the second syntax element, wherein to code the third syntax element the video decoder is configured to decode the third syntax element, wherein to code the fourth syntax element the video decoder is configured to decode the fourth syntax element, wherein to code the first video block the video decoder is configured to decode the first video block, and wherein to code the second video block the video decoder is configured to decode the second video block.

19. The video coding device of claim 13, wherein the video coding device is a video encoder, wherein to code the first syntax element the video encoder is configured to encode the first syntax element, wherein to code the second syntax element the video encoder is configured to encode the second syntax element, wherein to code the third syntax element the video encoder is configured to encode the third syntax element, wherein to code the fourth syntax element the video encoder is configured to encode the fourth syntax element, wherein to code the first video block the video encoder is configured to encode the first video block, and wherein to code the second video block the video encoder is configured to encode the second video block.

20. The device of claim 13, wherein the device comprises a wireless communication device, further comprising a receiver configured to receive encoded video data.

21. The device of claim 20, wherein the wireless communication device comprises a wireless telephone handset and wherein the receiver is configured to demodulate, according to a wireless communication standard, a signal comprising the encoded video data.

22. The device of claim 13, wherein the video coder is further configured to:
prior to coding the first syntax element, code a third syntax element to determine whether one of a lossless coding mode or the PCM coding mode is used for a group of video blocks that include the first video block and the second video block or that neither of the lossless coding mode nor the PCM coding mode is used for the group of video blocks, wherein the lossless coding mode refers to a mode that bypasses transform, quantization, and in-loop filtering in a coding process;
responsive to the third syntax element indicating a true value, code the first syntax element to determine which of the lossless coding mode or the PCM coding mode is used; and
responsive to the third syntax element indicating a false value, coding the group of video blocks with transform and quantization processes and not decoding the first syntax element.

23. A non-transitory computer-readable storage medium having stored thereon instructions that, when executed, cause a processor of a device for coding video data to:
code a first syntax element, wherein the first syntax element indicates that a pulse code modulation (PCM) coding mode is used for a first video block of a plurality of video blocks, wherein the PCM coding mode refers to a mode that codes pixel values as PCM samples;
code a second syntax element, wherein the second syntax element indicates that in-loop filtering is applied to the first video block;
applying in-loop filtering to the first video block based at least in part on the second syntax element
code the first video block based at least in part on the first syntax element and the second syntax element;
code a third syntax element, wherein the third syntax element indicates that the PCM coding mode is used for a second video block of the plurality of video blocks;
code a fourth syntax element, wherein the fourth syntax element indicates that in-loop filtering is not applied to the second video block; and
code the second video block based at least in part on the third syntax element and the fourth syntax element, wherein in-loop filtering is not applied to the second video block.

24. The non-transitory computer-readable storage medium of claim 23, wherein the first syntax element comprises a pcm_flag syntax element in a coding unit (CU) syntax level and wherein the second syntax element comprises a cu_transquant_loopfilter_bypass_flag syntax element in the CU syntax level.

25. The non-transitory computer-readable storage medium of claim 23, wherein the instructions further cause the processor of the device for coding video data to:
code a fifth syntax element (pcm_loop_filter_disable_flag) that indicates whether filtering is enabled;
responsive to the fifth syntax element indicating that filtering is enabled, apply filtering based at least in part on the second syntax element; and
responsive to the fifth syntax element indicating that filtering is disabled, disable filtering for one or more video blocks that have the PCM coding mode.

26. The non-transitory computer-readable storage medium of claim 23, wherein coding the first syntax element comprises decoding the first syntax element, and coding the second syntax element comprises decoding the second syntax element.

27. A video coding device comprising:
means for coding a first syntax element, wherein the first syntax element indicates that a pulse code modulation (PCM) coding mode is used for a first video block of a plurality of video blocks, wherein the PCM coding mode refers to a mode that codes pixel values as PCM samples;
means for coding a second syntax element, wherein the second syntax element indicates that in-loop filtering is applied to the first video block;
means for applying in-loop filtering to the first video block based at least in part on the second syntax element
means for coding the first video block based at least in part on the first syntax element and the second syntax element;
means for coding a third syntax element, wherein the third syntax element indicates that the PCM coding mode is used for a second video block of the plurality of video blocks;
means for coding a fourth syntax element, wherein the fourth syntax element indicates that in-loop filtering is not applied to the second video block; and
means for coding the second video block based at least in part on the third syntax element and the fourth syntax element, wherein in-loop filtering is not applied to the second video block.

28. The video coding device of claim 27, wherein the first syntax element comprises a pcm_flag syntax element in a coding unit (CU) syntax level and wherein the second syntax element comprises a cu_transquant_loopfilter_bypass_flag syntax element in the CU syntax level.

29. The video coding device of claim 27, further comprising:
means for coding a fifth syntax element (pcm_loop_filter_disable_flag) that indicates whether filtering is enabled;
responsive to the fifth syntax element indicating that filtering is enabled, means for applying filtering based at least in part on the second syntax element; and
responsive to the fifth syntax element indicating that filtering is disabled, means for disabling filtering for one or more video blocks that have the PCM coding mode.

30. The video coding device of claim 27, wherein the means for coding the first syntax element comprises means for decoding the first syntax element, and the means for coding the second syntax element comprises means for decoding the second syntax element.

31. A method of decoding video data, the method comprising:
decoding a first syntax element to determine whether one of a lossless coding mode or a pulse code modulation (PCM) coding mode is used for one or more video blocks or that neither of the lossless coding mode nor the PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples;
responsive to the first syntax element indicating a true value, decoding a second syntax element to determine which of the lossless coding mode or the PCM coding mode is used; and
responsive to the first syntax element indicating a false value, decoding the one or more video blocks with transform and quantization processes and not decoding the second syntax element.

32. The method of claim 31, further comprising:
decoding a third syntax element that indicates whether an in-loop filtering operation is used for one or more PCM samples; and
applying an in-loop filtering operation to the one or more PCM samples based on the first syntax element, the second syntax element, and the third syntax element.

33. The method of claim 32, wherein the first syntax element comprises a cu_transquant_bypass_flag syntax element in a coding unit (CU) syntax level, wherein the second syntax element comprises a pcm_flag syntax element in the CU syntax level, and wherein the third syntax element comprises a pcm_loop_disable_flag syntax element in the CU syntax level.

34. The method of claim 31, further comprising:
decoding the one or more video blocks based at least in part on the first syntax element and the second syntax element.

35. The method of claim 34, further comprising:
responsive to determining that the second syntax element indicates that the lossless coding mode is used, decoding the one or more video blocks using the lossless coding mode; and
responsive to determining that the second syntax element indicates that the PCM coding mode is used, decoding the one or more video blocks using the PCM coding mode.

36. A method of encoding video data, the method comprising:
encoding a first syntax element to indicate whether one of a lossless coding mode or a pulse code modulation (PCM) coding mode is used for one or more video blocks or that neither of the lossless coding mode nor the PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples;
responsive to the first syntax element indicating a true value, encoding a second syntax element to indicate which of the lossless coding mode or the PCM coding mode is used; and
responsive to the first syntax element indicating a false value, encoding the one or more video blocks with transform and quantization processes and not encoding the second syntax element.

37. The method of claim 36, further comprising:
encoding a third syntax element to indicate whether an in-loop filtering operation is used for one or more PCM samples; and
applying an in-loop filtering operation to the one or more PCM samples based on the first syntax element, the second syntax element, and the third syntax element.

38. The method of claim 37, wherein the first syntax element comprises a cu_transquant_bypass_flag syntax element in a coding unit (CU) syntax level, wherein the second syntax element comprises a pcm_flag syntax element in the CU syntax level, and wherein the third syntax element comprises a pcm_loop_disable_flag syntax element in the CU syntax level.

39. The method of claim 36, further comprising:
encoding the one or more video blocks based at least in part on the first syntax element and the second syntax element.

40. The method of claim 39, further comprising:
wherein encoding the second syntax element further comprises encoding the second syntax element to indicate that the lossless coding mode is used when the one or more video blocks was encoded with the lossless coding mode, and wherein encoding the second syntax element further comprises encoding the second syntax element to indicate that the PCM coding mode is used when the one or more video blocks was encoded with the PCM coding mode.

41. A video coding device comprising:
a video data memory storing one or more video blocks; and
a video coder configured to:
code a first syntax element that indicates whether one of a lossless coding mode or a pulse code modulation (PCM) coding mode is used for the one or more video blocks or that neither of the lossless coding mode nor the PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples;
responsive to the first syntax element indicating a true value, code a second syntax element that indicates which of the lossless coding mode or the PCM coding mode is used; and
responsive to the first syntax element indicating a false value, code the one or more video blocks with transform and quantization processes and not coding the second syntax element.

42. The video coding device of claim 36, the video coder further configured to:
code a third syntax element that indicates whether an in-loop filtering operation is used for one or more PCM samples; and
applying an in-loop filtering operation to the one or more PCM samples based on the first syntax element, the second syntax element, and the third syntax element.

43. The video coding device of claim 42, wherein the first syntax element comprises a cu_transquant_bypass_flag syntax element in a coding unit (CU) syntax level, wherein the second syntax element comprises a pcm_flag syntax element in the CU syntax level, and wherein the third syntax element comprises a pcm_loop_disable_flag syntax element in the CU syntax level.

44. The video coding device of claim 41, wherein the video coding device comprises a video decoder, wherein to code the first syntax element the video decoder is configured to decode the first syntax element, wherein to code the second syntax element the video decoder is configured to, responsive to the first syntax element indicating a true value, decode a second syntax element that indicates whether one of the lossless coding mode is used or the PCM coding mode is used, the video decoder further configured to:
  decode the one or more video blocks based at least in part on the first syntax element and the second syntax element.

45. The video coding device of claim 41, wherein the video coding device comprises a video encoder, wherein to code the first syntax element the video encoder is configured to encode the first syntax element, wherein to code the second syntax element the video encoder is configured to, responsive to the first syntax element indicating a true value, encode a second syntax element that indicates whether one of the lossless coding mode is used or the PCM coding mode is used, the video encoder further configured to:
  encode the one or more video blocks based at least in part on the first syntax element and the second syntax element.

46. A non-transitory computer-readable storage medium having stored thereon instructions that, when executed, cause a processor of a device for coding video data to:
  code a first syntax element that indicates whether one of a lossless coding mode or a pulse code modulation (PCM) coding mode is used for one or more video blocks or that neither of the lossless coding mode nor the PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples;
  responsive to the first syntax element indicating a true value, code a second syntax element that indicates which of the lossless coding mode or the PCM coding mode is used; and
  responsive to the first syntax element indicating a false value, code the one or more video blocks with transform and quantization processes and not coding the second syntax element.

47. The non-transitory computer-readable storage medium of claim 46, the instructions further cause a processor of a device for coding video data to:
  code a third syntax element that indicates whether an in-loop filtering operation is used for one or more PCM samples; and
  apply an in-loop filtering operation to the one or more PCM samples based on the first syntax element, the second syntax element, and the third syntax element.

48. A video coding device comprising:
  means for coding a first syntax element that indicates whether one of a lossless coding mode or a pulse code modulation (PCM) coding mode is used for one or more video blocks or that neither of the lossless coding mode nor the PCM coding mode is used for the one or more video blocks, wherein the lossless coding mode refers to a mode that bypasses transform, quantization, and in-loop filtering in a coding process and wherein the PCM coding mode refers to a mode that codes pixel values as PCM samples;
  responsive to the first syntax element indicating a true value, means for coding a second syntax element that indicates which of the lossless coding mode or the PCM coding mode is used; and
  means for, responsive to the first syntax element indicating a false value, coding the one or more video blocks with transform and quantization processes and not coding the second syntax element.

49. The video coding device of claim 48, further comprising:
  means for coding a third syntax element that indicates whether an in-loop filtering operation is used for one or more PCM samples; and
  means for applying an in-loop filtering operation to the one or more PCM samples based on the first syntax element, the second syntax element, and the third syntax element.

* * * * *